US006242682B1

(12) United States Patent
Marinic et al.

(10) Patent No.: US 6,242,682 B1
(45) Date of Patent: Jun. 5, 2001

(54) COMPONENT MOUNT AND COMPONENTS FOR MUSICAL INSTRUMENTS

(75) Inventors: Josip Marinic, Erlangen (DE); James R. Rosenberg, Thompson Station, TN (US)

(73) Assignee: Gibson Guitar Corp., Nashville, TN (US)

( * ) Notice: Subject to any disclaimer, the term of this patent is extended or adjusted under 35 U.S.C. 154(b) by 0 days.

(21) Appl. No.: 09/461,530

(22) Filed: Dec. 15, 1999

Related U.S. Application Data

(63) Continuation of application No. 08/889,232, filed on Jul. 8, 1997, now Pat. No. 6,075,194.

(51) Int. Cl.[7] .............................. G10H 1/02; G01P 3/00

(52) U.S. Cl. .............................. 84/626; 84/600; 84/662; 84/671; 84/701; 84/737

(58) Field of Search .............................. 84/600, 626–633, 84/662–665, 671, 701–711, 723–726, 737–741

(56) References Cited

U.S. PATENT DOCUMENTS

| | | | | |
|---|---|---|---|---|
| Re. 26,533 | | 3/1969 | Cookerly et al. | 84/723 |
| 3,709,084 | | 1/1973 | Stobaugh | 84/726 |
| 3,742,114 | * | 6/1973 | Barkan | 84/740 |
| 4,175,462 | | 11/1979 | Simon | 84/728 |
| 4,327,419 | | 4/1982 | Deutsch et al. | 708/250 |
| 4,336,734 | | 6/1982 | Polson | 84/646 |
| 4,339,979 | * | 7/1982 | Norman | 84/1.23 |
| 4,757,737 | | 7/1988 | Conti | 84/681 |
| 4,823,667 | | 4/1989 | Deutsch et al. | 84/736 |
| 4,852,444 | | 8/1989 | Hoover et al. | 84/738 |
| 4,913,024 | | 4/1990 | Carriveau | 84/726 |
| 5,001,960 | | 3/1991 | Katou | 84/735 |
| 5,007,324 | | 4/1991 | DeMichele | 84/741 |
| 5,014,589 | | 5/1991 | Obata | 84/735 |
| 5,085,120 | | 2/1992 | Ishiguro | 84/737 |
| 5,140,890 | | 8/1992 | Elion | 84/736 |
| 5,478,969 | * | 12/1995 | Cardey, III et al. | 84/626 |
| 5,561,257 | * | 10/1996 | Cardey, III et al. | 84/626 |
| 5,585,583 | | 12/1996 | Owen | 84/470 R |
| 5,633,474 | * | 5/1997 | Cardey, III | 84/663 |
| 5,866,834 | | 2/1999 | Burke et al. | 84/622 |

* cited by examiner

*Primary Examiner*—Robert E. Nappi
*Assistant Examiner*—Marlon Fletcher
(74) *Attorney, Agent, or Firm*—McAfee & Taft

(57) ABSTRACT

A mount by which a component is non-destructively mounted on a musical instrument includes a receptacle and one or more abutment members, such as resilient clips, which do not screw into the instrument but engage the instrument to hold the mount on the instrument. A component is secured to the mount to install the component on the instrument. One such component provides digital control of an analog tone adjustment circuit. The digital control can include selectable preset conditions. Another such component provides on-board effects processing, such as a chorus effect. An output electrical coupling is provided with a switch used to energize the circuit of the component with which it is used.

25 Claims, 12 Drawing Sheets

COMPONENT MOUNT AND COMPONENTS FOR MUSICAL INSTRUMENTS

This application is a continuation of application Ser. No. 08/889,232 filed on Jul. 8, 1997, now U.S. Pat. No. 6/075, 194 and which designated the U.S.

BACKGROUND OF THE INVENTION

This invention relates to mounts by which components can be mounted on musical instruments. Non-limiting examples of components that can be mounted by the present invention include signal processing components for musical instruments that have their music electronically amplified. The present invention also relates to two types of such components and an electrical coupling that can be used with the components.

The musical instruments to which the present invention pertains can be of any type with which the present invention is useful. One particularly suitable type of musical instrument is a hollow body guitar that can acoustically and mechanically output sound but for which electrical amplification is desired. More generally, the present invention is applicable to any guitar which has on-board (i.e., on the instrument) circuitry for enabling electrical amplification. Such electrical amplification can be the sole means of sound reproduction (e.g., a solid body guitar with electromagnetic pickups) or as an adjunct to mechanical sound reproduction/amplification (e.g., a hollow body guitar which has a sound hole and to which a microphone or other transducer is connected). The one common feature of the musical instruments to which the signal processing components of the present invention pertain is that each instrument provides and processes the electrical signal through an analog circuit as opposed to a purely digitally reproduced or synthesized sound.

On at least some types of these musical instruments, there is only a thin piece of wood to which to secure the electrical amplification circuit components. One way such components can be secured is to put screws through a housing holding the components and into the wood of the instrument; however, it is relatively easy to pull out these screws because of the thinness of the wood, thereby leaving the circuit unsecured and possibly damaging the instrument as well as the circuit. Attachment by screws can itself damage the wood or the finish on the wood (e.g., by causing splitting), such as if holes for the screws are not drilled properly. Thus, there is the need for an improved mount for components to be carried on musical instruments.

As to the components that can be so mounted, these can be anything that needs to be mounted. Examples include switches, knobs and entire circuits. One specific component is a housing with an internal circuit that processes the analog electric signal from the electric pickup device. In general, these components give the musician some control over the sound that is electrically reproduced (i.e., control beyond the actual playing of the instrument). In the past, this control has typically been limited to changing potentiometers in bass, midrange and treble circuits and the like and to actuating switches to select different pickup combinations or filter networks. To enhance player control of the reproduced music, there is the need for more sophisticated on-instrument control that musicians can operate while playing.

In providing more sophisticated on-instrument control, there is also the need for an output electrical coupling from the circuit that enables energization of the circuit when a mate is connected to the coupling (e.g., a plug inserted into a socket).

SUMMARY OF THE INVENTION

The present invention meets the aforementioned needs by providing a novel and improved component mount and novel and improved signal processing components for musical instruments. A novel and improved electrical coupling is also provided.

The present invention provides a mount that can be readily installed on and removed from a musical instrument. Installation does not require screwing the mount to the instrument itself.

The present invention also provides components which enable sophisticated control beyond the conventional manual bass, midrange, treble, pickup combination and the like control. In particular, the present invention provides digital preset control and/or on-board effects processing.

The present invention further provides an electrical coupling that includes a switch which is operated by connecting the coupling's mate to the coupling.

The mount of the present invention is for a musical instrument having a side wall with inside and outside surfaces. The mount comprises a receptacle to receive and mount a component on the musical instrument. The receptacle has a flange to engage the outside surface of the side wall of the musical instrument. The mount also comprises an abutment member connected to the receptacle such that the abutment member abuts the inside surface of the side wall of the musical instrument when the flange of the receptacle engages the outside surface of the side wall of the musical instrument.

The mount is part of a component assembly for the musical instrument. In a particular implementation the mount includes a frame and two clips connected to respective locations of the frame such that the clips and the frame cooperate to hold the component assembly on the musical instrument when the component assembly is mounted thereon. The assembly further comprises a component for the musical instrument and means for securing the component to the frame.

Although any suitable component can be mounted on the instrument using the mount of the present invention, an inventive such component comprises: a tone control variable resistance; a comparator having an input connected to the tone control variable resistance; a microcomputer connected to an output of the comparator; a comparator control circuit connected to the microcomputer and another input of the comparator; a tone adjustment circuit connected to an analog signal generator (which generates an analog signal in response to playing of the musical instrument) to process an analog signal from the analog signal generator in the analog domain; and an interface circuit to vary the analog processing of the tone adjustment circuit in response to a digital signal from the microcomputer. This component can further comprise a preset selection switch connected to the microcomputer.

Another inventive component for a musical instrument having an analog signal generator responsive to playing of the musical instrument comprises: an electrical signal processing effects circuit; and a housing having the electrical signal processing effects circuit mounted therein, which housing is adapted to mount on the musical instrument and to connect to the analog signal generator. Stated another way, the invention provides a musical instrument comprising: a portable body; a plurality of strings attached to the body; an analog signal generator mounted on the body and responsive to playing of the strings; and an electrical signal processing effects circuit mounted on the body and connected to the analog signal generator.

The present invention also provides an electrical coupling which comprises: a body; an electrically conductive connector member disposed on the body such that the connector member engages a mating coupling to complete an electrical path therethrough in response to connecting the mating coupling to the electrical coupling; and a switch disposed on the body, which switch has a first switch state and a second switch state and which switch switches from the first switch state to the second switch state in response to connecting the mating coupling to the electrical coupling.

Therefore, from the foregoing, it is a general object of the present invention to provide a novel and improved component mount and novel and improved signal processing components for musical instruments. It is also an object of the present invention to provide a novel and improved electrical coupling. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 6 is an illustration showing the side mounting of another type of component of the present invention on a guitar.

DETAILED DESCRIPTION OF THE INVENTION

Figure 1:
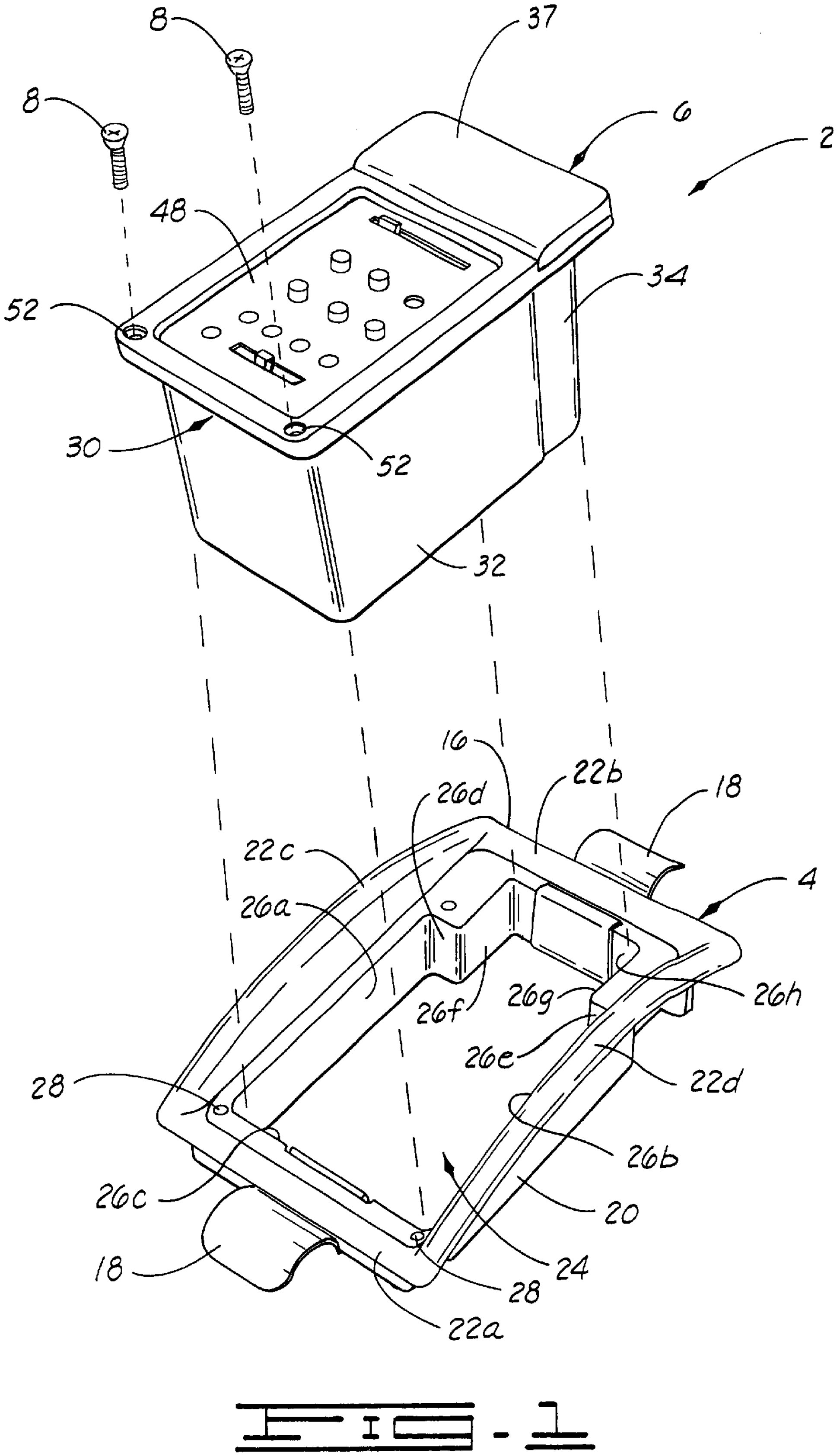
FIG. 1 is an exploded perspective view of the preferred embodiment component mount and assembly, including one particular type of component, of the present invention.

Referring to FIG. 1, a component assembly 2 of the present invention comprises a mount 4 for a musical instrument, a component 6 for the musical instrument, and means for securing the component 6 to the mount 4. In the FIG. 1 embodiment, the means for securing includes two screws 8.

Figure 3:
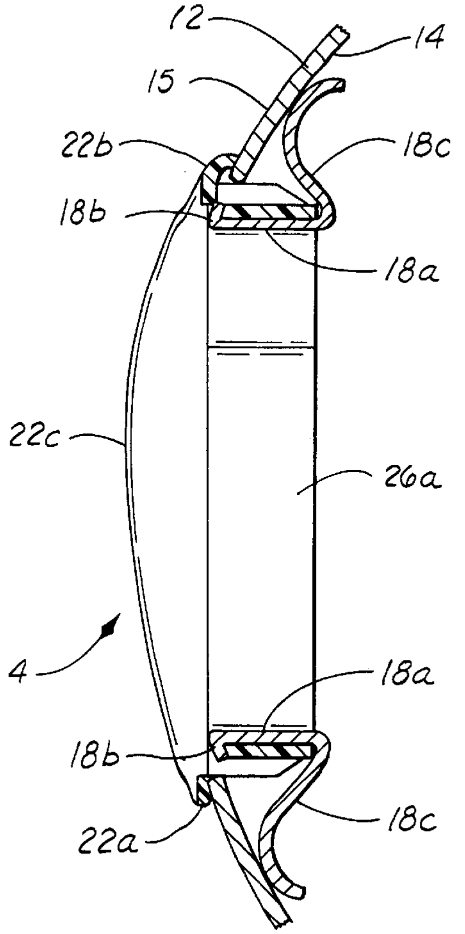
FIG. 3 is a sectional side view, along line 3—3 in FIG. 2, of the mount installed on a musical instrument.

As mentioned above, the musical instrument with which the component assembly 2 can be used is of any suitable type. It is preferably one with a portable body and strings, such as a guitar 10 as illustrated in FIGS. 4 (front view) and 6 (partial side view). Whatever particular instrument is used, it has a side wall 12 with an inside surface 14 and an outside surface 15 as illustrated in FIG. 3. The side wall 12 of the guitar 10 on which the component assembly 2 is mounted in these illustrations is the side or rim of the guitar; however, the component assembly 2 can be mounted on other members implementing the side wall 12.

Figure 2:
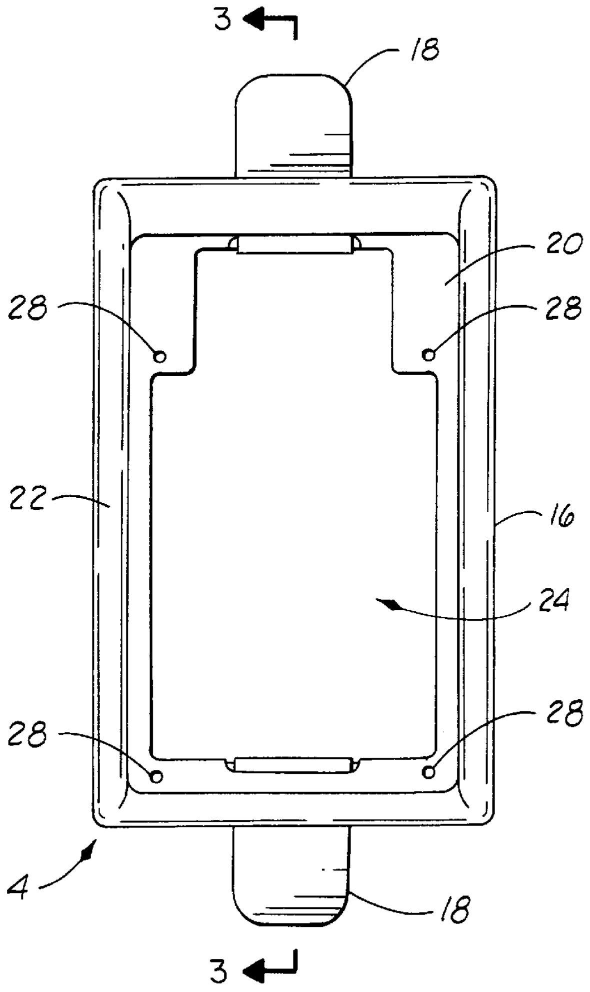
FIG. 2 is a front view of the mount of FIG. 1.

Referring to FIGS. 1–3, the mount 4 includes a receptacle 16 and one or more abutment members 18.

The receptacle 16 receives and mounts the component 6 on the musical instrument. The receptacle 16 of the preferred embodiment includes a frame defined by a body 20 from one side of which a flange 22 extends outwardly.

The body 20 has a generally rectangular shape; however, the body 20 has an opening 24 defined therethrough by interior surface 26. The interior surface 26 has facing, parallel opposed surfaces *26a*, *26b*, and a transverse (specifically, perpendicular in the illustrated embodiment) surface *26c* extending between one end of each of the surfaces *26a*, *26b*. Disposed opposite the surface *26c* are surfaces *26d* and *26e* which extend transversely to and inwardly from the opposite ends of the surfaces *26a*, *26b*. Surfaces *26f*, *26g* extend perpendicularly from surfaces *26d*, *26e*, respectively. Surface *26h* extends between opposite ends of surfaces *26f*, *26g* parallel to aligned surfaces *26d*, *26e* which are parallel to surface *26c*. Surfaces *26c* and *26h* are notched to receive respective abutment members 18. Surfaces *26f*, *26g*, *26h* define a keyway relative to the main rectangular portion of the opening 24. The keyway is defined to receive a key structure of the component 6 to be described below. The body 20 has suitable holes defined therein to receive and engage with the threaded shanks of the screws 8. Four such holes 28 are shown in FIG. 2, the lower two of which are used to receive the two screws 8 in the FIG. 1 application.

The flange 22 that extends around the perimeter of the body 20 has straight end segments *22a*, *22b*. The segment *22a* extends parallel to and adjacent the end of the body 20 having interior surface *26c*, and the flange segment *22b* extends along the opposite end of the body 20 having the interior surface portion *26h*. Extending perpendicularly between these end flange segments *22a*, *22b* are side flange segments *22c*, *22d*. These flange segments have arcuate shapes as is apparent from FIGS. 1 and 3. The curvature of these side flange segments is preferably such that it matches a curve of an upper bout of the guitar when installed as illustrated in FIGS. 4 and 6.

The mount 4 can be constructed in any suitable manner. One example is injection molding using a suitable plastic, such as ABS or polycarbonate.

In the embodiment of FIGS. 1–3, there are two abutment members 18, each defined by a respective resilient clip releasably attached to the body 20 of the receptacle 16 beneath the end segments *22a*, *22b* of the flange 22. These clips are disposed such that they and the flange 22 cooperate to hold the component assembly 2 on the musical instrument when the component assembly is mounted thereon. As shown in FIG. 3, each clip 18 has a substantially straight section 18*a* from which an inwardly angled gripping or retaining lip 18*b* extends. The segments 18*a*, 18*b* engage the respective one of the notches of the interior surfaces 26*c*, 26*h*. Extending from the end of the segment 18*a* opposite lip 18*b* is an arcuate segment 18*c*. Each clip 18 is made of a rigid but resilient material, such as a suitable metal or plastic, such that the arcuate portion 18*c* can be deflected away from the segment 18*a* but with a return biasing force by which the arcuate segment 18*c* applies a holding pressure against the inside surface 14 of the side wall 12 of the musical instrument when the mount 4 is installed as illustrated in FIG. 3.

In the installed position shown in FIG. 3, at least flange segments 22*a*, 22*b* (and preferably also segments 22*c*, 22*d*) engage the outside surface 15 of the side wall 12 of the musical instrument and the arcuate segments 18*c* of these embodiments of the abutment members 18 abut the inside surface 14 of the side wall 12 of the musical instrument when the flange of the receptacle engages the outside surface of the side wall of the musical instrument. The clips 18 are removable so that they can first be disconnected from the receptacle 16 prior to installation in the side wall 12. This allows the body 20 of the receptacle 16 to be pushed through an opening defined in the side wall 12 of the musical instrument as illustrated in FIG. 3 and also apparent from FIGS. 4A and 6. Each of the abutment members 18 can then be installed in the positions shown in FIG. 3 so that the retaining biasing forces exerted by the segments 18*c* of the abutment members 18 act against the inside surface 14 of the side wall 12 while the flange 22 prevents the receptacle from passing farther through the opening in the side wall 12.

The component 6 of the assembly 2 is sized and shaped to be received through the opening 24 defined in the receptacle of the mount 4. In the illustrated embodiment, this size and shaping is substantially coextensive with the shape defined by the interior surface 26 of the body 20 but allowing a suitable tolerance so that the component 6 can slide relative to the mount 4. This enables the component 6, once inserted into the opening 24, to hold the clips 18 in place.

Referring to FIGS. 1 and 4–8, the component 6 of the preferred embodiments includes a housing 30 having a main body 32 shaped and sized to be received within the portion of the frame opening 24 defined by the surfaces 26*a*, 26*b*, 26*c*, 26*d* and 26*e*. Extending above and inwardly from the sides of the main body 32 is a key structure 34 shaped complementally to the portion of the opening 24 defined by interior side surfaces 26*f*, 26*g*, 26*h* of the mount 4. This gives the key structure 34 a rectangular shape. Extending downwardly from the key structure 34 and rearwardly from the main body 32 is a rectangular portion 36 apparent in FIGS. 5, 7 and 8. The main body 32, the key structure 34, and the portion 36 are hollow. A respective circuit described below is received in this hollow interior space of the main body 32, and a battery to energize the circuit is housed in the cavity of the key structure 34. Wires connecting the battery to the circuit extend through the hollow of the portion 36. A removable cover 37 provides access to the cavity in the key structure 34 where the battery is housed.

Figure 4A:
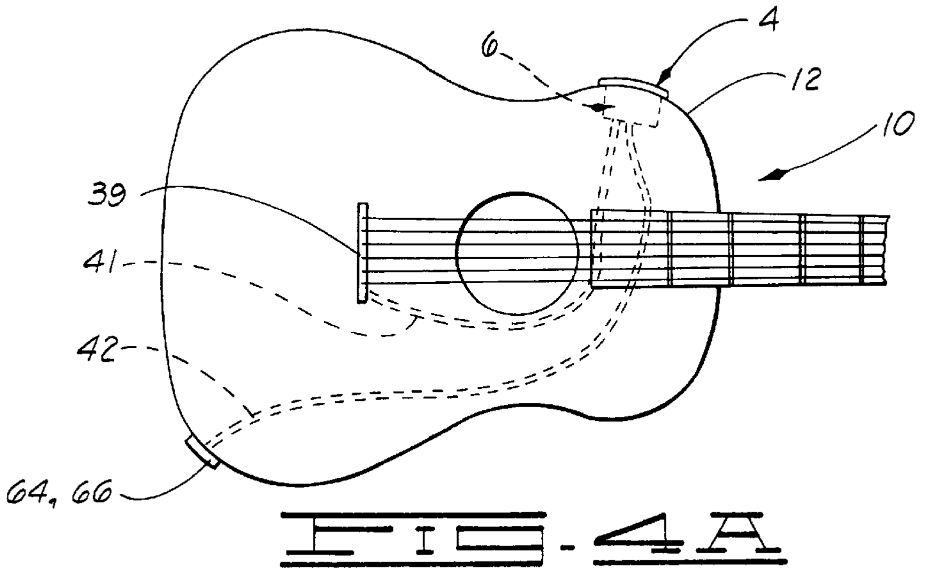
FIG. 4A illustrates a location of the mount, component and its output electrical coupling on a guitar.

The main body 32 is closed at its back by a plate 38 which supports an input connector 40. The input connector 40 is shown as a jack into which a plug of an analog signal generator is inserted. The analog signal generator is any suitable device that produces an analog electric signal in response to playing of the instrument. Non-limiting examples of such an analog signal generator include piezoelectric or electromagnetic pickups or a microphone. In the guitars 10 of FIGS. 4A and 6, a pickup 39 (FIG. 4A) is a bridge mounted piezo type known in the art. FIG. 4A depicts an electrical conductor cable 41 connecting the pickup 39 to the input jack 40.

Figure 5:
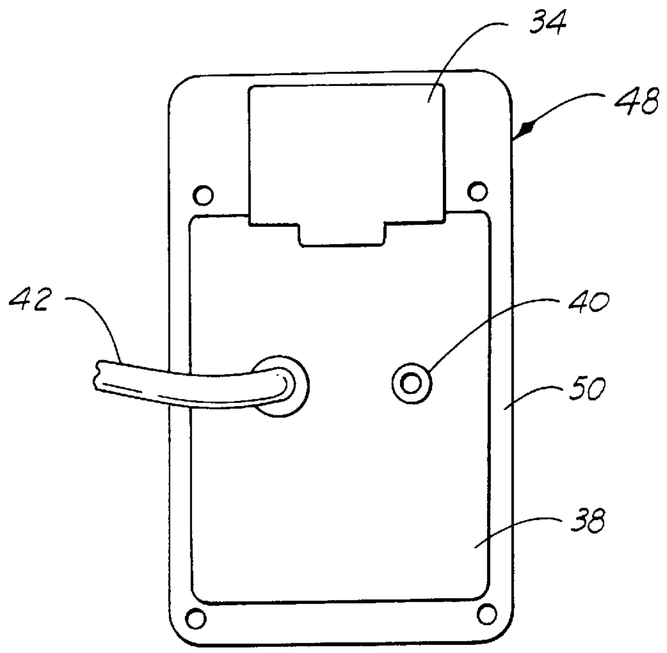
FIG. 5 is a rear view of the component of FIG. 4B.
Figure 8:
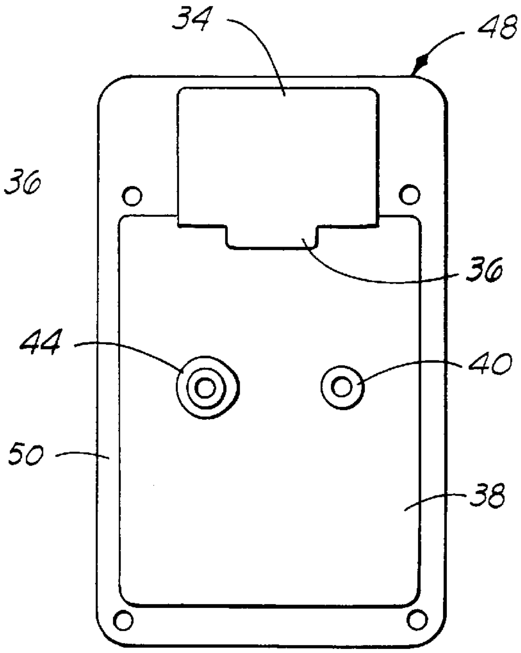
FIG. 8 is a rear view of the component illustrated in FIG. 6.
Figure 5:
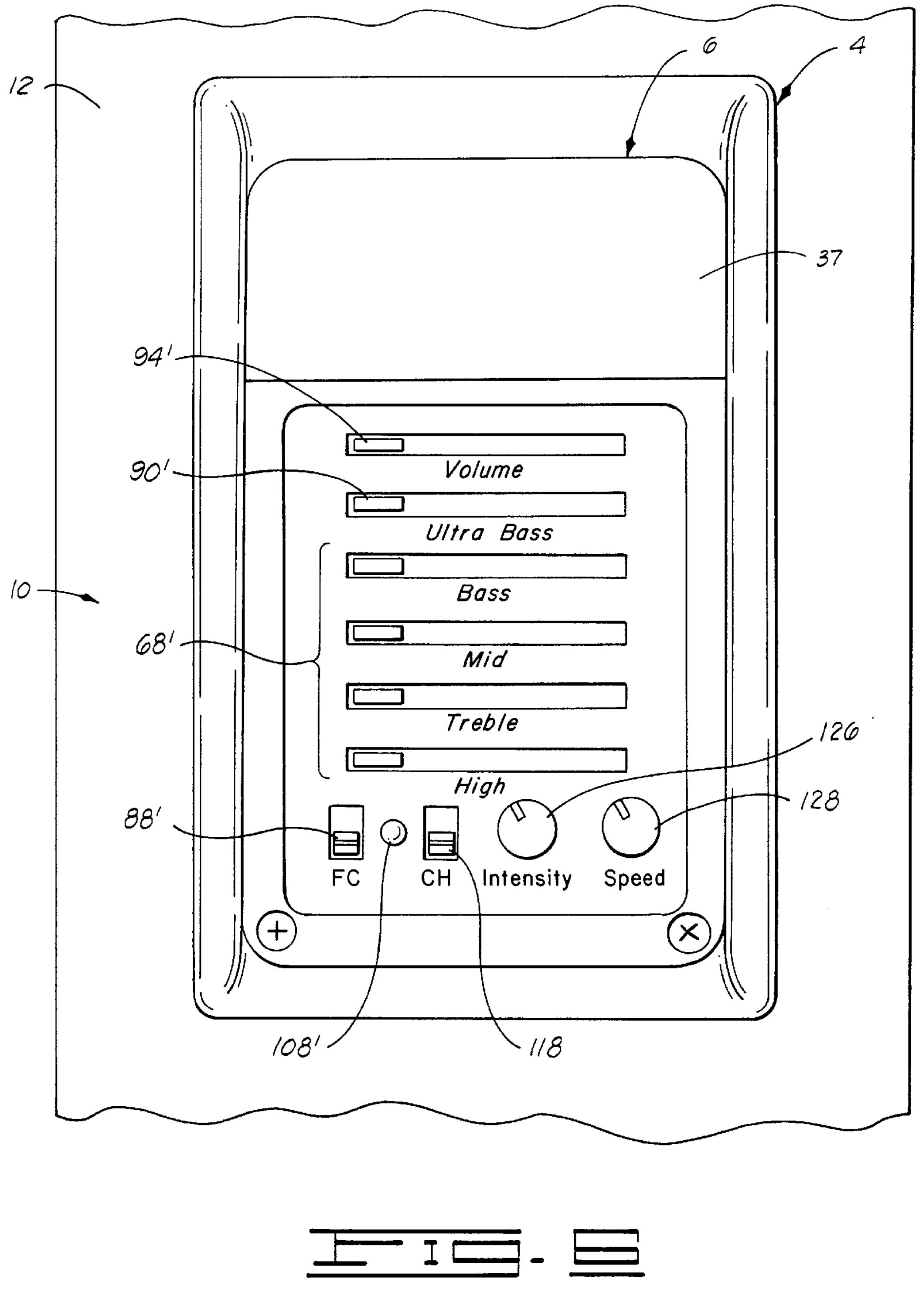

In FIG. 5, the plate 38 supports an output connector that includes a cable 42. In FIG. 8, the output connector includes a jack 44 that can receive a plug of a cord to connect to an external amplifier, for example.

Figure 7:
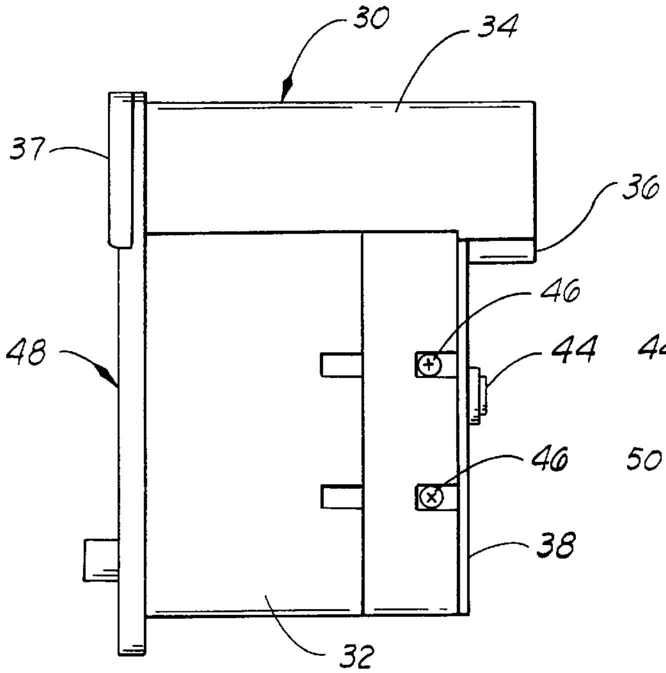
FIG. 7 is a side view of the component illustrated in FIG. 6.

The back plate 38 is retained by suitable means (e.g., glue, or mounting screws, two of which are shown in FIG. 7 and identified by the reference numeral 46).

Extending across the front of the component 6 is a face plate 48 which extends laterally outwardly from adjacent portions of the main body 32 and the key structure 34 thereby defining a rim 50 (see FIGS. 5 and 8).

The component 6 is installed in the mount 4 by pushing the component 6 through the mount opening 24 with the key structure 34 aligned with the keyway defined by surfaces 26*f*, 26*g*, 26*h* of the mount 4. Thus, the keyway and the key structure are used so that the frame of the mount 4 must receive the component 6 in a predetermined orientation defined by the keyway and the key structure. Sizing the main body 32 and the key structure 34 substantially coextensively with the size of the opening 24 enables the lower surface of the main body 32 to hold the adjacent abutment member 18 in place as does the upper surface of the key structure 34 relative to the oppositely disposed abutment member 18. The component 6 is pushed into the mount 4 until the rim 50 of the component 6 engages the body 20 of the mount 4 inside the flange 22 such as illustrated in FIG. 6.

To secure the component 6 to the mount 4, the screws 8 are inserted through holes 52 defined through the rim 50 of the face plate 48 of the component 6 and turned to engage the aligned holes 28 of the mount 4. Thus, the mount 4 is firmly secured to the side wall 12 of the musical instrument without using screws or other objects penetrating the instrument's thin side wall 12. The only screws used are those that engage with the mount 4 and the component 6. The relatively large surface area of the portion of the arcuate segment 18*c* of each of the abutment members allows for firm engagement with the side wall without damaging it.

The component 6 can be made in the same manner and with the same material as the mount 4.

Figure 9:
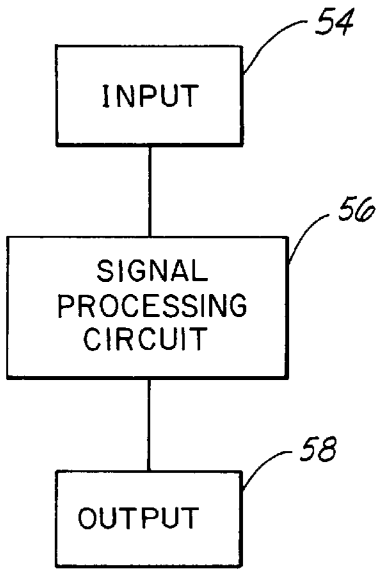
FIG. 9 is a block diagram for circuits of the components illustrated in FIGS. 4–8.

The component 6 also includes a circuit that is completely contained within the housing 30 of the component 6. In preferred embodiments to be described below in more detail, the circuit of the component 6 includes an input 54, a signal processing circuit 56 and an output 58 as represented in FIG. 9. These elements are contained within the housing 30 provided by the main body 32, the key structure 34, the body portion 36 and the face plate 48 of the component 6. The input 54 includes the socket 40 such as illustrated in FIGS. 5 and 8, and the output 58 includes the cable 42 or the socket 44 as illustrated in FIGS. 5 and 8, respectively. The signal processing circuit 56 connects to these input and output elements, and particular implementations of the signal processing circuit for different preferred embodiments will be described below. In general, the signal processing circuit 56 includes a tone control circuit 60 represented in FIG. 10; and in one embodiment to be described below, the signal processing circuit 56 also or alternatively includes an effects circuit 62.

Figure 10:
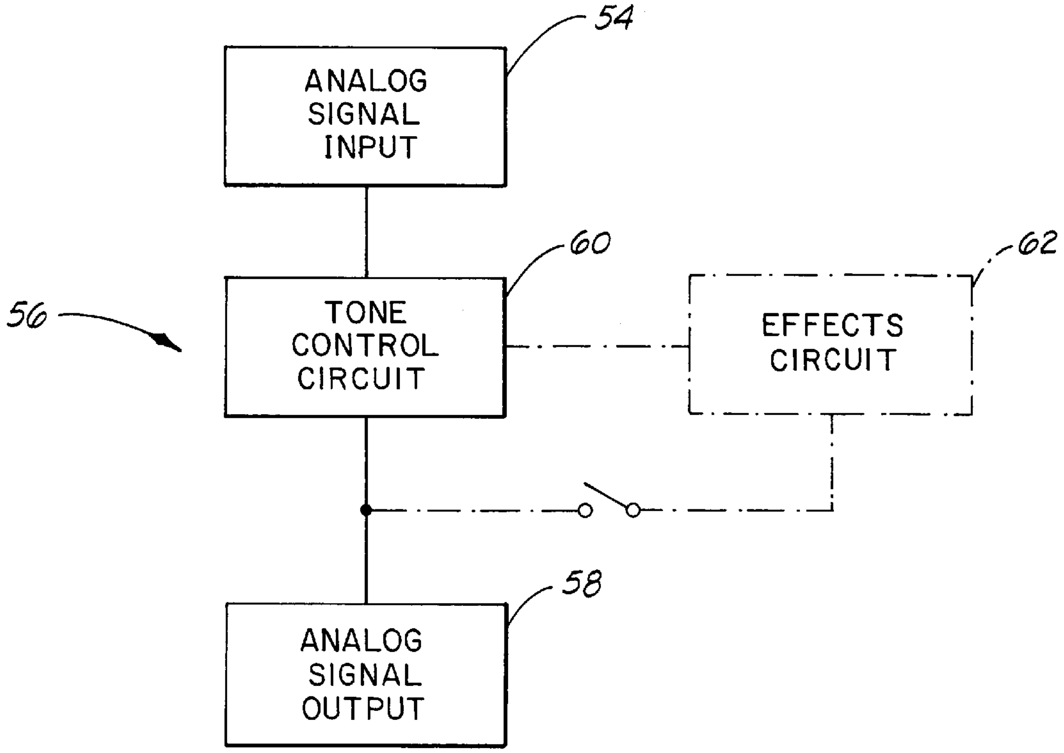
FIG. 10 is a more detailed block diagram for the circuits of the components illustrated in FIGS. 4–8.

One aspect of the present invention is that the inputs and outputs are of analog signals as indicated by the analog signal input 54 and analog signal output 58 designations of FIG. 10. That is, the preferred embodiments of the present invention use analog signal processing for the music reproduction signal so that the output signal has a conventional analog sound component; however, the various embodiments of the signal processing circuit 56 can have digital control features as will be explained.

Figure 11A:
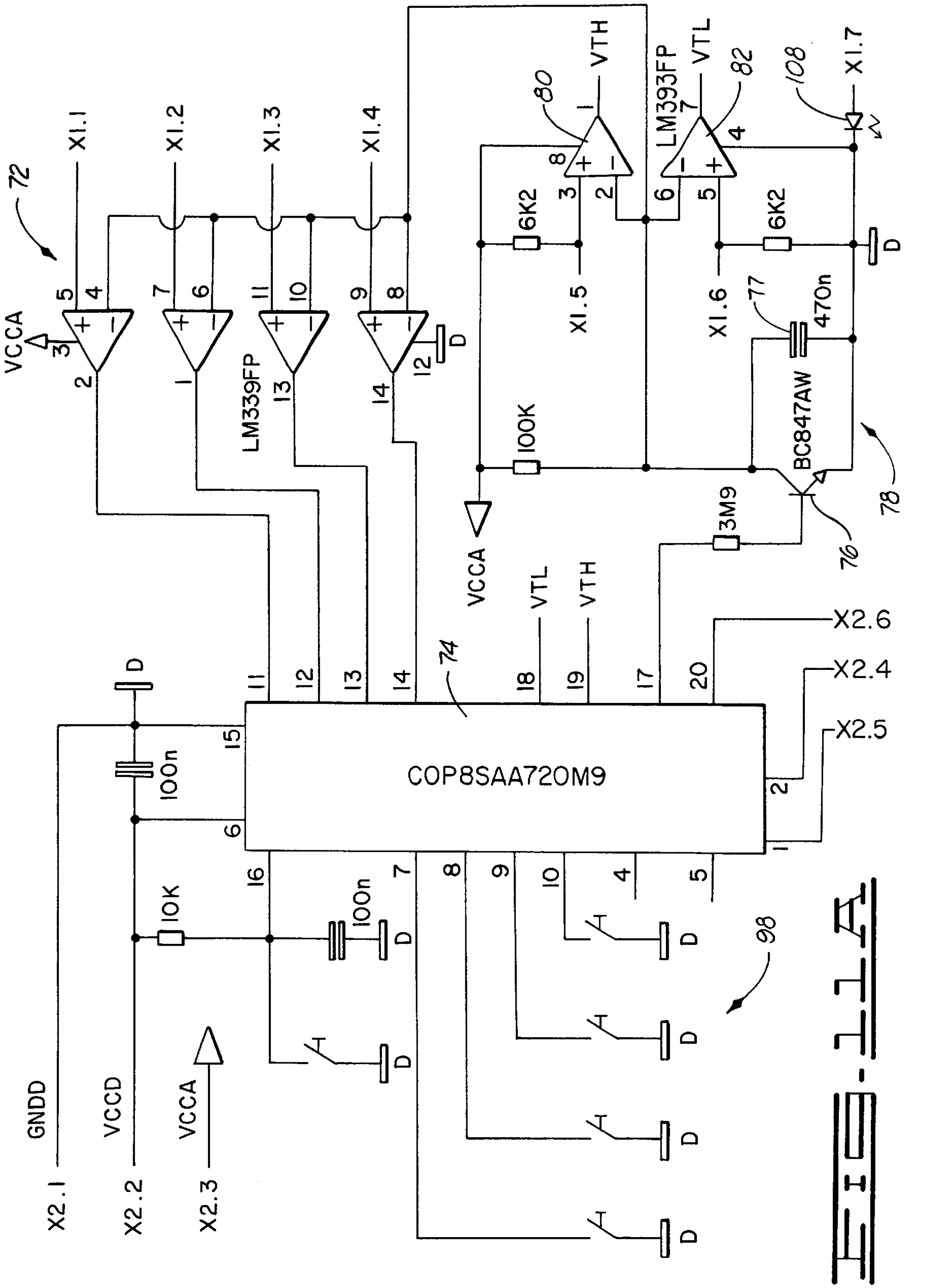
FIGS. 11A and 11B are schematic circuit diagrams for a particular implementation of one embodiment of a tone control circuit represented in FIG. 10 and contained in the component of FIG. 4B.

A particular implementation of the tone control circuit 60 is shown in FIGS. 11A and 11B. This circuit is contained in the housing 30 of the component 6 described above. The circuit is connected to the input provided by the socket 40 as shown in FIG. 11B, and it is also connected to dual outputs 64, 66 (FIG. 11B) as connected through the cable 42 (FIG. 4A). The output connectors 64, 66 are shown in an installed location on the guitar 10 in FIG. 4A. As mentioned above, the input 40 and the outputs 64, 66 are for analog electric signals. The output 64 is a high impedance output and the output 66 is a symmetric output which enables connection to equipment having symmetrical XLR inputs.

Figure 15:
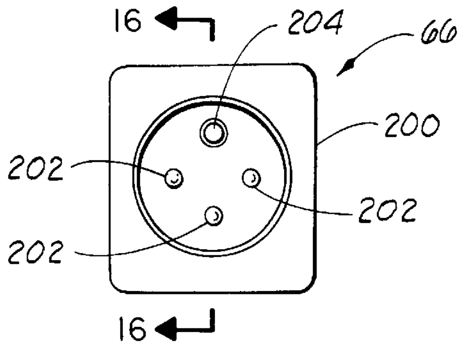
FIG. 15 is an end view of a particular implementation of an electrical coupling of the present invention.
Figure 16:
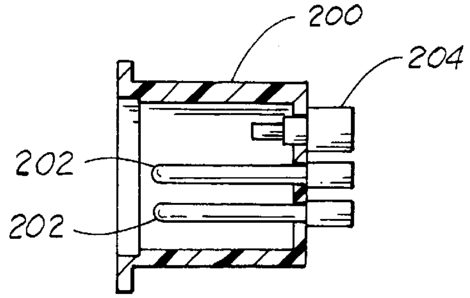
FIG. 16 is a sectional view along line 16—16 in FIG. 15.
Figure 11:
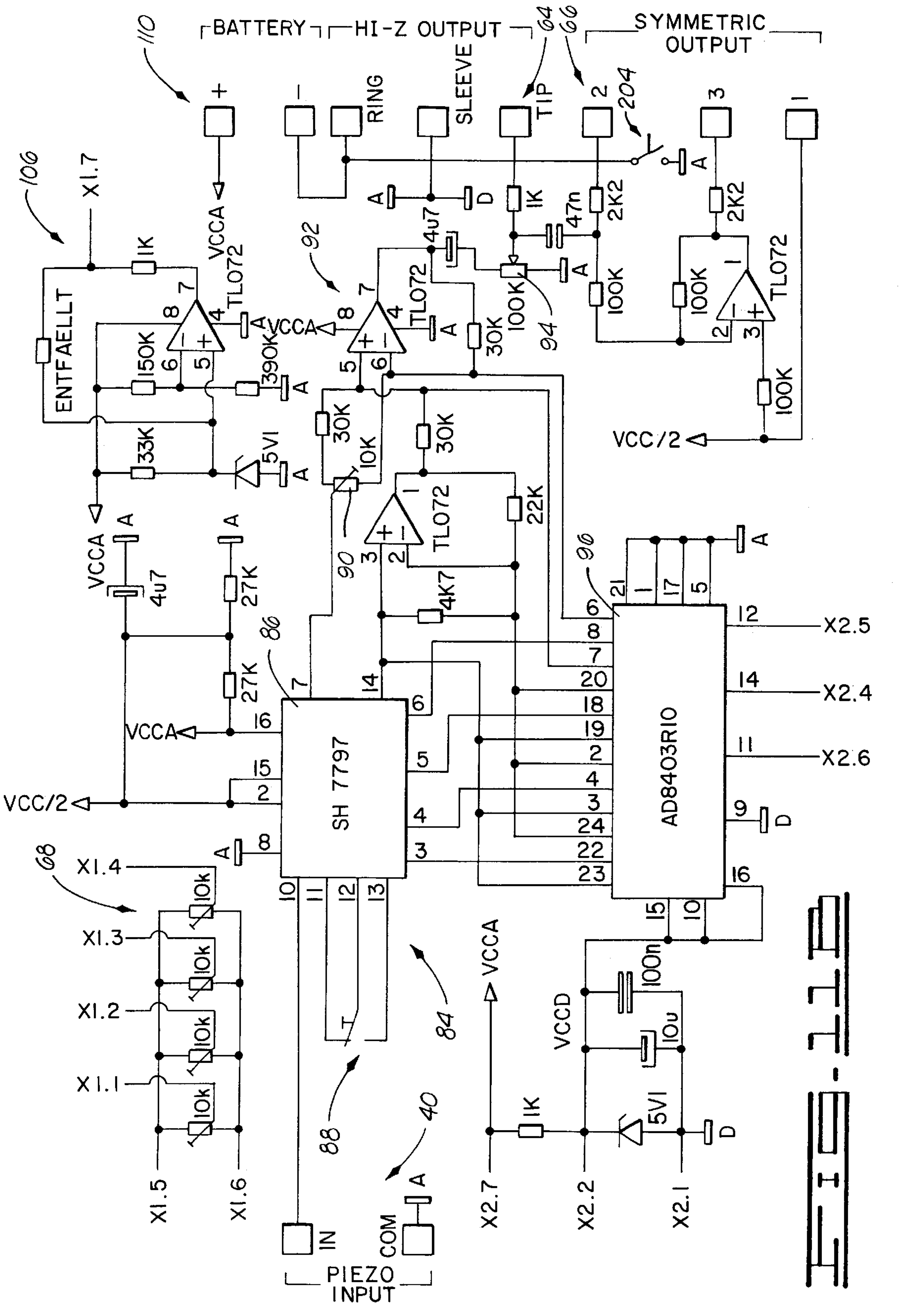

The output connectors 64, 66 can be of conventional types; however, the preferred embodiment of the circuit of FIG. 11 implements the connector 66 with a novel and improved electrical coupling illustrated in FIGS. 15 and 16. The coupling includes a conventional body 200 in which one or more electrically conductive members are disposed to engage a mate of the electrical coupling in response to connecting the mating coupling with the described electrical couplings (e.g., if the coupling is in a socket configuration as shown in FIGS. 15 and 16, the mate would typically be of a complementally configured plug type). In FIGS. 15 and 16, three pins 202 are shown to implement the electronically conductive members. The electrical coupling further includes a switch 204 particularly illustrated as a pushbutton type. Without the mate connected to the illustrated electrical coupling, the switch 204 is in one switch state (open for the embodiment used in FIG. 11B). When the mate is connected to the electrical coupling, the switch 204 is depressed by the mate and thereby operated to another switch state (closed for the embodiment used in FIG. 11B) merely by connecting the mate to the coupling.

The purpose of this electrical coupling will be described with reference to FIG. 11B. This drawing shows that one terminal of the switch 204 is connected to the negative terminal of a battery when the battery is attached to a connector 110. The other terminal of the switch 204 connects to the analog ground of the circuit of FIGS. 11A and 11B. When there is no external connection of the mate of the electrical coupling, the switch 204 is open as illustrated in FIG. 11B; however, when the mating plug for the depicted embodiment is inserted into the cavity of the body 200 of the coupling, the plug engages the pushbutton of the switch 204 and closes the switch, thereby connecting the battery to ground and energizing the circuit of the component 6. Thus, this provides that the circuit is not energized until the musical instrument is connected to an external device system (which typically includes an amplifier). This is a typical function for an on-instrument circuit (see, e.g., the jack 64 which enables this by connecting the battery to ground when a plug is inserted and connects the ring and sleeve contacts labeled in FIG. 11B); however, the switch 24 allows this to be implemented solely by the coupling 66. That is, without the switch 204, the otherwise conventional connector 66 could not connect the battery to ground because each of the pins 202 is dedicated to another function; therefore, even if only the output from the connector 66 were desired, a plug would also have to be inserted into the jack 64 to energize the circuit. Thus, the inventive coupling shown in FIGS. 15 and 16 and represented in FIG. 11B provides for a stand-alone symmetric output connector that has a circuit energizing switch capability.

Figure 4B:
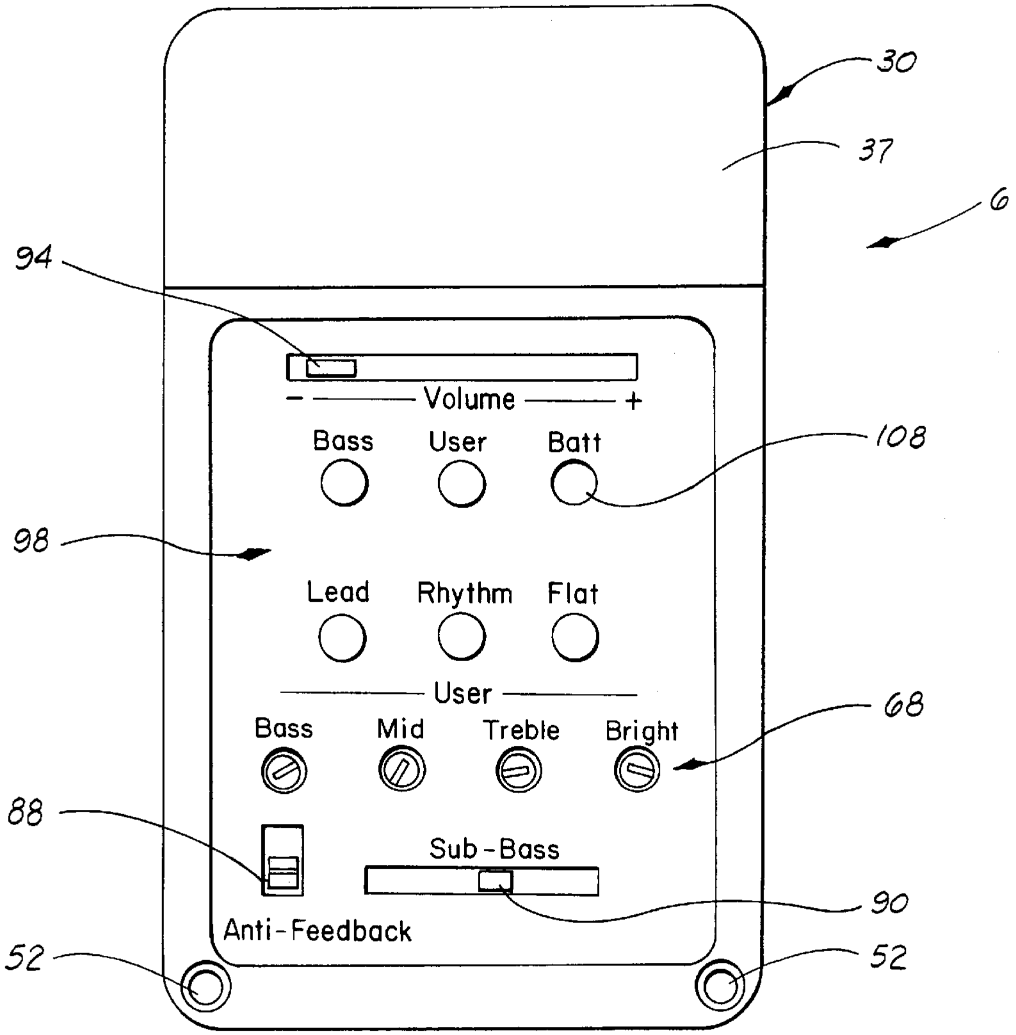
FIG. 4B is a front view of the particular type of component illustrated in FIG. 1.

The tone control circuit shown in FIGS. 11A and 11B has at least one tone control variable resistance. In the illustrated implementation, there are a plurality of potentiometers 68 (specifically, four shown in FIG. 11B). These have respective wiper controls accessible to the player of the musical instrument at the face plate 48 of the component 6 as shown in FIG. 4B using the same reference numeral 68 (these are rotary wiper actuators in the illustrated embodiment). The potentiometers 68 provide respective control of bass, midrange, treble and brilliance/brightness tone ranges.

The tone control circuit of FIGS. 11A and 11B also includes a respective comparator 72 for each of the tone control variable resistances 68. The comparators 72 are shown in FIG. 11A. Each non-inverting input is connected to a respective one of the wiper terminals of the potentiometers 68. The outputs of the comparators 72 are connected to respective inputs of a microcomputer 74.

The microcomputer 74 provides an output to control the on/off state of a transistor 76 of a comparator control circuit 78. When the microcomputer 74 turns the transistor 76 on, the inverting inputs of comparators 80, 82 and of comparators 72 are pulled low. Comparators 80, 82 monitor the high and low voltages applied to the potentiometers 68, which voltages are applied to the non-inverting inputs of the comparators 80, 82, respectively. These voltages are greater than the low level applied to the inverting inputs when the transistor 76 is switched on; therefore, in this condition the outputs of both comparators 80, 82 are high. The same is true for the comparators 72.

When the microcomputer 74 turns the transistor off, a ramping voltage caused by capacitor 77 is applied to the inverting inputs of the comparators 72, 80, 82. When this voltage passes the low voltage threshold of comparator 82, the output of comparator 82 switches low. This is sensed by the microcomputer 74, which resets internal counters or timers assigned for each of the comparators 72 and for an autocalibration function and which starts a timing period. The timing period continues until the ramping voltage exceeds the high voltage threshold of the comparator 80, whereupon the output of the comparator 80 goes low. This is sensed by the microcomputer 74, which stops the timing and turns the transistor 76 on to discharge the capacitor 77.

Discharging the capacitor 77 brings the voltage below the threshold of the comparator 80 so that it switches to a high output, and it brings the voltage below the threshold of the comparator 82 so that it also switches to a high output. This is sensed by the microcomputer 74, which in response turns the transistor 76 off to begin a new cycle.

The foregoing is used as an analog-to-digital conversion technique for digitizing the outputs of potentiometers 68. These outputs are provided to the non-inverting inputs of respective ones of the comparators 72. When the ramping voltage from the capacitor 77 passes these levels, the respective comparator outputs switch to a low level which is sensed by the microcomputer 74 and causes it to stop the respective internal counter or timer for that comparator. The timer values and the autocalibration enable the microcomputer 74 to know the relative setting of the respective potentiometer 68.

The autocalibration measures the time between the output of comparator 82 going low and the output of comparator 80 going low. This enables automatic compensation or calibration for component tolerances and supply voltage swing.

The comparators 72 and the control circuit 78 are used only in the user select preset mode further described below.

The tone control circuit of FIGS. 11A and 11B also includes a tone adjustment circuit 84 (FIG. 11B) connected to the input 40. The tone adjustment circuit 84 processes an analog signal from the analog signal generator in the analog domain. This includes an integrated circuit 86 that uses hybrid technology to define active filters for implementing tone adjustments. The chip 86 of the preferred embodiment contains (1) a preamplifier, (2) a phase shifter controlled by a switch 88 accessible through the face plate 48 as shown by use of the same reference numeral in FIG. 4B, and (3) the active filters used for equalizing or otherwise adjusting tone. The tone adjustment circuit 84 also includes a potentiometer 90 for sub-bass control. The potentiometer 90 connects to an output amplifier section 92 that provides its output to a volume control potentiometer 94, all as shown in FIG. 11B. The wiper of the volume control potentiometer 94 is connected to the outputs 64, 66. The sub-bass potentiometer 90 and the volume control potentiometer 94 have their wiper controls accessible through the exposed face plate 48 of the housing 30 of the component 6 as shown by the use of like reference numerals in FIG. 4B.

The tone control circuit of FIGS. 11A and 11B also includes an interface circuit to vary the analog processing of the tone adjustment circuit 84 in response to a digital signal from the microcomputer 74. The interface circuit includes a digital potentiometer chip 96 (FIG. 11B) that receives serially transmitted data and control signals from the three outputs of the microcomputer 74 shown in FIGS. 11A and 11B as connected between is the microcomputer 74 and the integrated circuit 96. The resistances provided by the chip 96 are part of the active filters defined with the chip 86. In response to an appropriate digital signal from the microcomputer 74, the element 96 changes the effective resistance of one or more of these active filters, thereby affecting the tone of the output signal.

The aforementioned portions of the tone control circuit of FIGS. 11A and 11B enable the player of the musical instrument to adjust the tone of the output analog signal. This is implemented by the player controlling one or more of the four potentiometers 68. The settings of these are read by the microcomputer 74 as those signals are translated through the comparators 72 and the internal timers of the microcomputer 74. In response, the microcomputer 74 generates a serial digital signal provided to the interface circuit 96 which in turn changes the characteristics of the active analog filters defined with the circuit element 86. Sub-bass control and volume control can be manually changed by the player via the potentiometers 90, 94, respectively.

The circuit of FIGS. 11A and 11B also provides for preset conditions to be selected in controlling the operation of circuit elements 96 and 86. This includes one or more preset selection switches connected to the microcomputer 74. Five pushbutton switches 98 are shown in FIG. 11A, and their pushbutton actuation members are accessible to the player through the face plate 48 as illustrated in FIG. 4B with the use of the same reference number. Each selection switch 98 is responsive to actuation by the player of the musical instrument. In response to actuation of one of these switches, the microcomputer 74 controls the interface circuit 96. Four of the switches 98 cause the microcomputer 74 to recall preset conditions that remain stored in the memory of the microcomputer 74 (these are factory preset conditions, one of which merely adjusts to midscale of the potentiometers in chip 96; this is the "flat" switch 98 as so labeled in FIG. 4B). A fifth one of the switches 98 enables user defined settings to be used by the microcomputer 74. In the illustrated embodiment of FIGS. 11A and 11B, actuation of the "user" switch 98 puts the microcomputer 74 in the mode in which it uses the comparators 72 and comparator control circuit 78 and uses that data to generate and send the digital control signals to the digital/analog interface chip 96 as described above.

Figure 12:
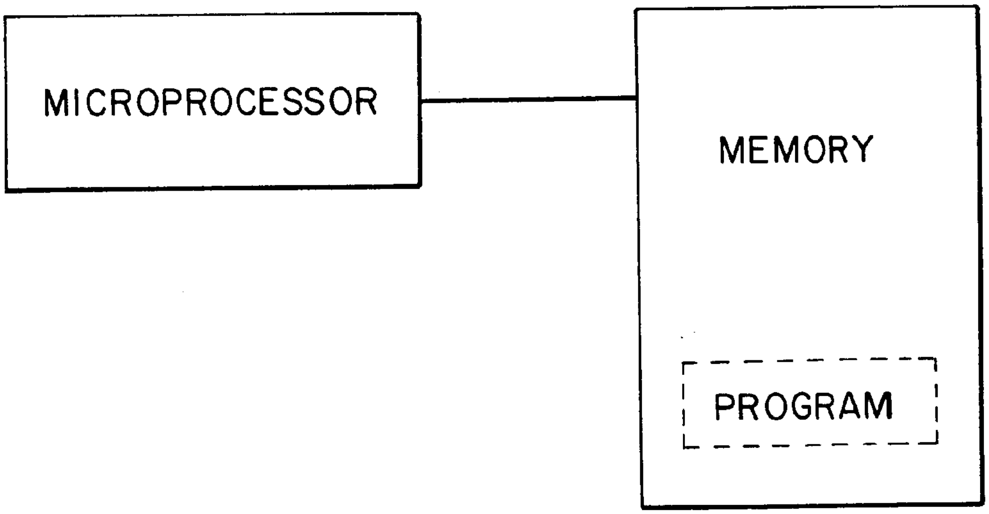
FIG. 12 is a block diagram for a microcomputer of the circuit of FIGS. 11A and 11B.
Figure 13:
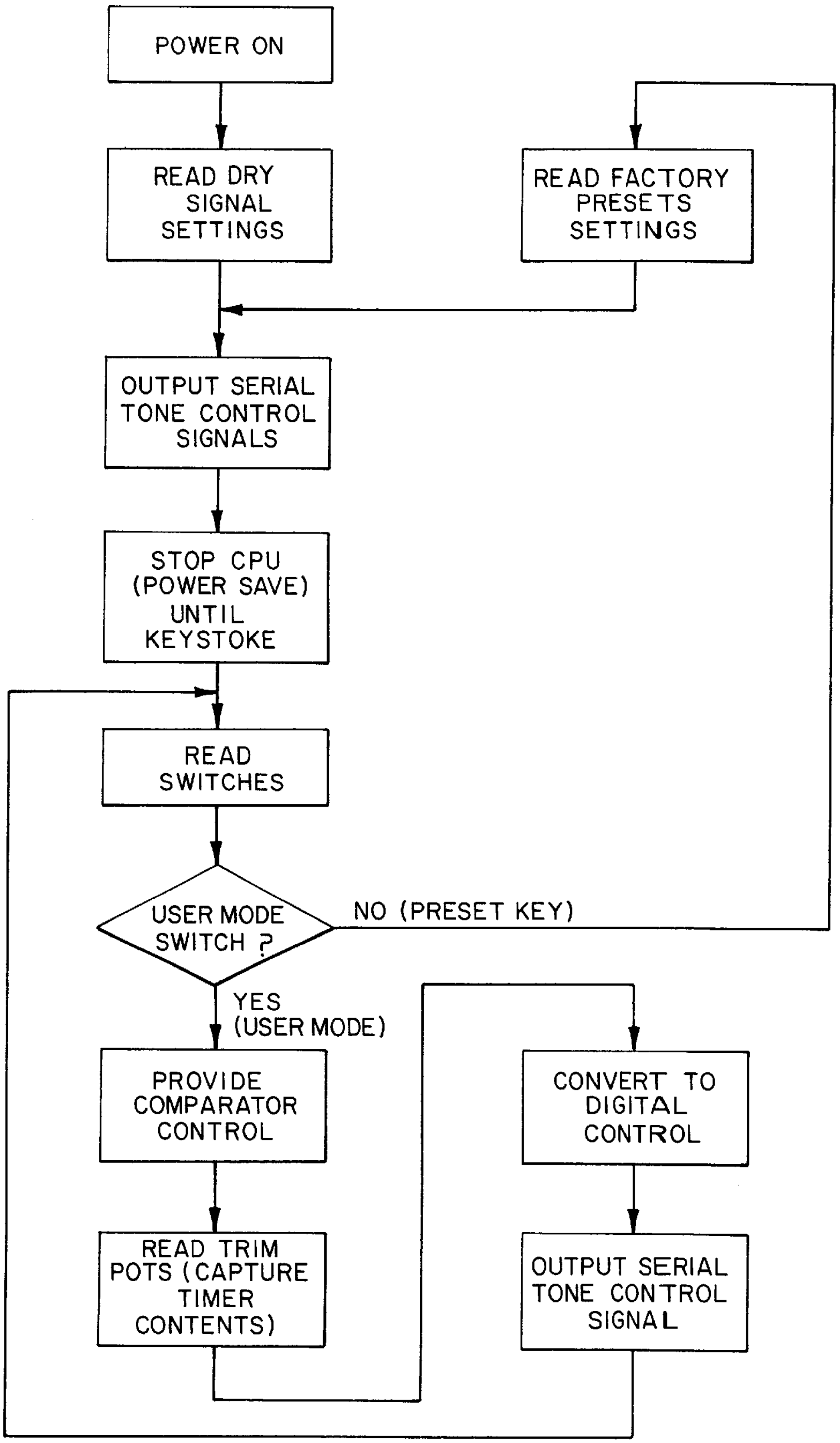
FIG. 13 is a flow diagram of a program for the microcomputer depicted in FIG. 12

Referring to FIGS. 12 and 13, the microcomputer 74 includes a microprocessor 100 and a memory 102. Stored in the memory 102 is a program 104 containing instructions that define how the microprocessor 100 and the overall microcomputer 74 operate. A flow diagram for such a program 104 is shown in FIG. 13.

Upon power up, the program 104 causes the microcomputer 74 to read what are referred to as the "dry" signal settings from memory. These are the midscale settings also used in response to actuation of the "flat" switch 98 that resets the microcomputer 74 to this state. Once these are initially output as the appropriate serial tone control signals, the program puts the microcomputer 74 in a power saving mode until one of the switches 98 is actuated.

If the "user" switch 98 is actuated, the program 104 causes the microcomputer 74 to provide the comparator control, determine the timer counts responsive to the settings of the potentiometers 68, convert to digital control, and output corresponding serial tone control signals to the chip 96 as described above with reference to comparators 72 and comparator control circuit 78.

If one of the remaining three of the switches 98 is actuated (i.e., the "bass," "lead" and "rhythm" switches in FIG. 4B), the program 104 reads the corresponding pre-stored data from the memory 102 and outputs the respective digital control signals to the interface chip 96 in response.

The tone control circuit of FIGS. 11A and 11B also includes a battery monitoring circuit 106 shown in FIG. 11B. The circuit 106 drives a light emitting diode 108 (see FIGS. 11A and 4B) until the battery level drops below a predetermined level (e.g., 6 volts for a 9-volt battery). The battery is connected to terminals 110 shown in FIG. 11B, and the battery is contained within the housing 30 of the component 6 (specifically the key structure 34 with the connecting wires in the portion 36).

Figure 14:
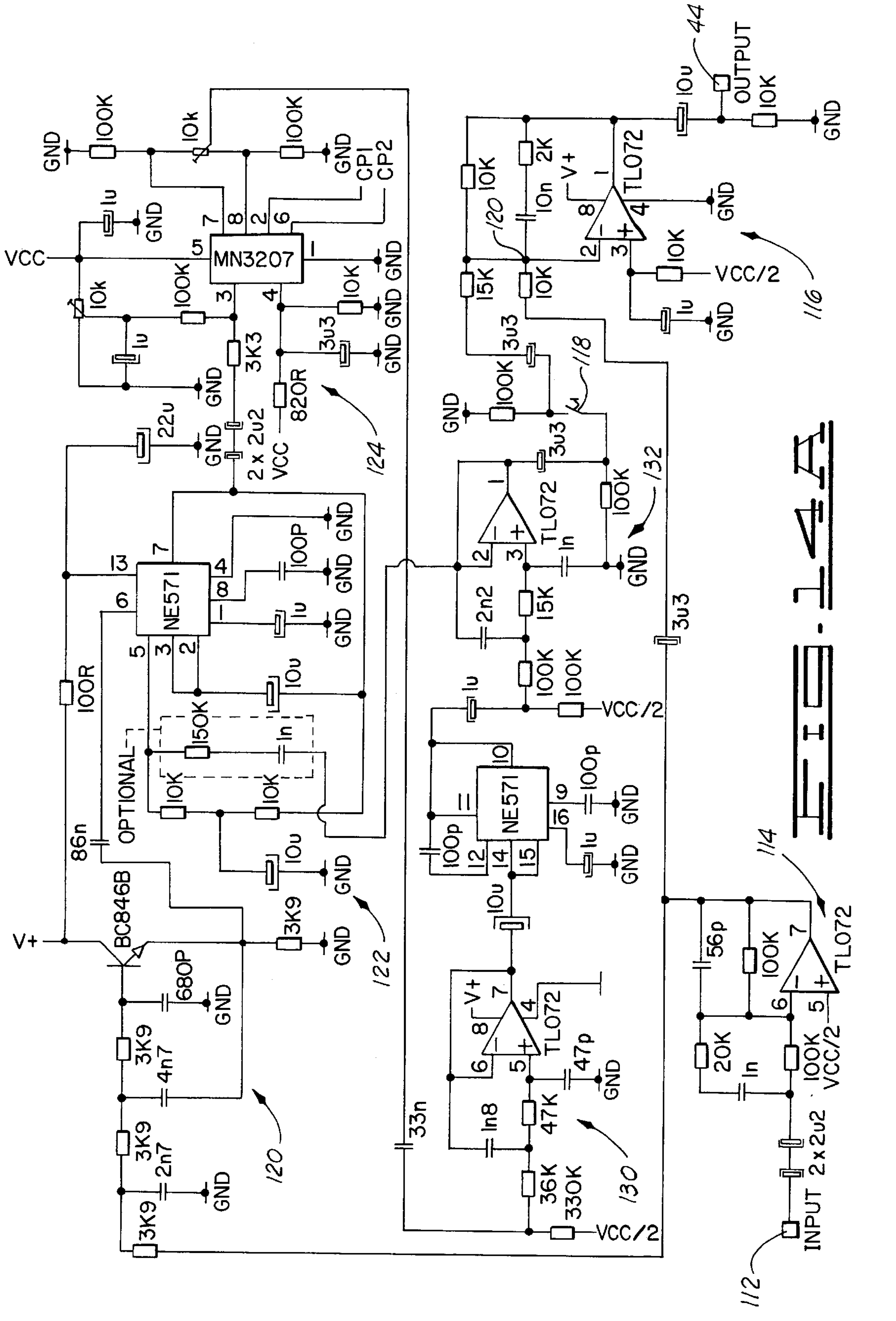
FIGS. 14A–14C are schematic circuit diagrams for a particular implementation of one embodiment of an effects circuit represented in FIG. 10 and contained in the component of FIG. 6.
Figure 14B:
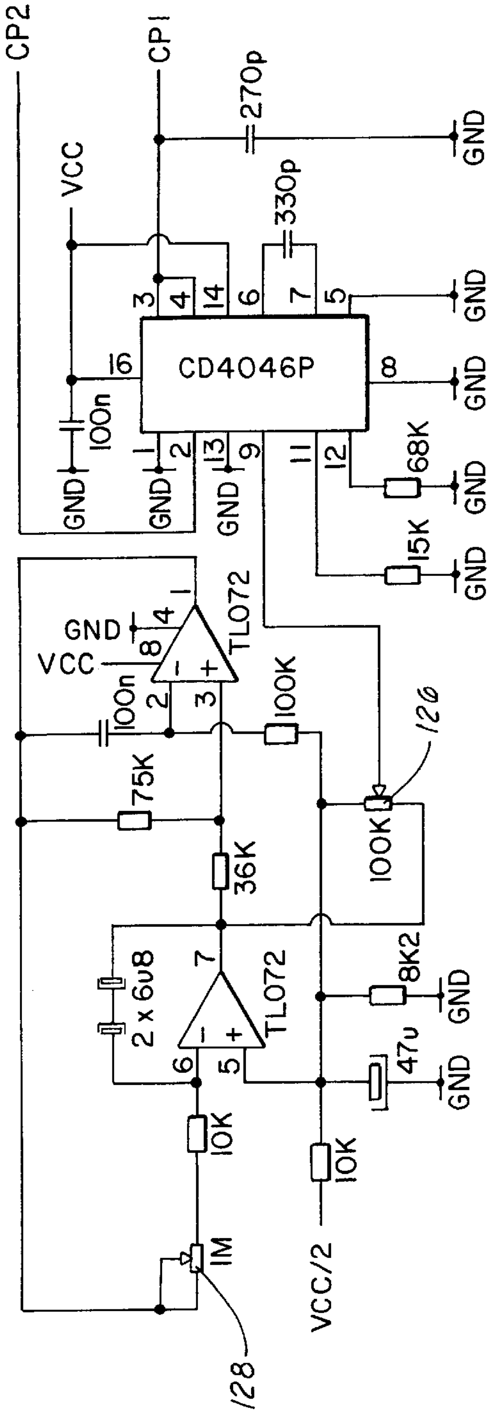
Figure 14C:
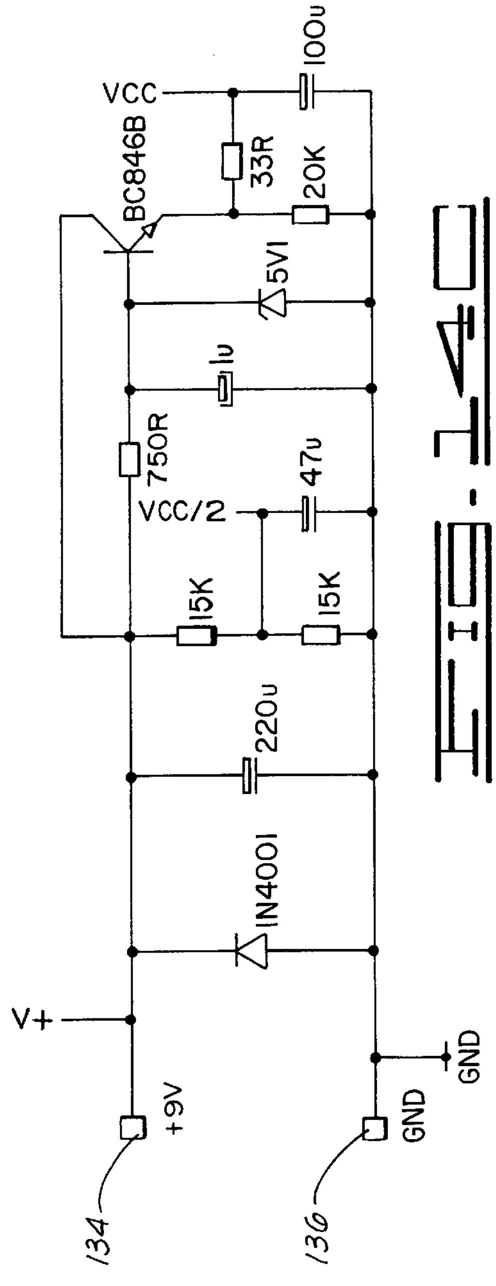

Referring next to FIGS. 14A–14C, a particular implementation of the effects circuit 62 represented in FIG. 10 will be described. The circuit shown in these drawings is typically used in conjunction with some type of tone control circuit 60, which may be of the type described with reference to FIGS. 11–13 or which can be any other suitable type, including a conventional analog tone control circuit. Regardless of which tone control circuit is used, it will typically have similar external controls such as volume, sub-bass, bass, mid, treble and high/bright range controls. These are designated in FIG. 6 by the same reference numerals used for the tone control circuit of FIGS. 11A and 11B but with prime marks to indicate merely corresponding function (in FIG. 6, these are implemented with slider actuated potentiometers). In its broadest aspects, however, the present invention provides a musical instrument with an on-board effects circuit or, stated another way, an effects circuit contained in a housing that can be mounted on a portable musical instrument, such as a guitar.

For the typical use with a tone control circuit of whatever type, the output of the tone control circuit is provided to the input to the effects circuit 62 of FIGS. 14A–14C. This input is identified by the reference numeral 112 in FIG. 14A, and the analog signal received via this input passes through buffer section 114. The output of section 114 goes to both the effects processing section and output buffer section 116. If effects select switch 118 shown in FIG. 14A is open, the only signal provided through the sections 114, 116 to the output

44 is the basic tone (and volume) adjusted signal received through the input 112. If, however, the switch 118 is closed, this signal is combined with the effects signal generated in response to the basic signal. These two signals are combined at junction 120 at the inverting input of the operational amplifier of the circuit 116. Thus, the switch 118 either connects the effects circuit to the output 44 or disconnects the effects circuit from the output.

The effects circuit shown in FIGS. 14A–14C is specifically a chorus effects circuit; however, it is contemplated that other types of effects (e.g., reverb) can be implemented. One such other effect that can be implemented with the circuit of FIGS. 14A–14C is a flanger effect achieved by adding the components marked "optional" in FIG. 14A.

The illustrated effects circuit includes a decimator section 120 shown in FIG. 14A. The illustrated decimator circuit 120 is a third order low pass filter which keeps high frequencies out of the subsequent portions of the effects circuit.

The effects circuit also includes a compression section 122 shown in FIG. 14A. The compression circuitry reduces the signal amplitude to a level compatible with the input specification of the next portion of the effects circuit. Filtering the signal and reducing the amplitude prevents overloading the next portion of the circuit, which overloading could produce a harsh output sound.

This next portion is identified by the reference number 124 in FIG. 14A. This section 124 includes a digital counter addressed analog memory chip that reads the CP1 signal from the circuitry shown in FIG. 14B. The memory chip stores the signal received from the section 122 as clocked in by the CP1 signal. The signal is read out in response to signal CP2 from FIG. 14B. The frequency difference between CP1 and CP2 is the frequency modulation of the effects signal.

The circuit of FIG. 14B includes a low frequency triangle wave generator and a voltage controlled oscillator. This circuit enables the player to control the amount of detuning of the chorus effect and the rate or speed for the detuned signal. The intensity or depth of detuning is controlled by a potentiometer 126, and the rate or speed of fluctuation of the signal is controlled by a potentiometer 128. The amplitude out of the low frequency triangle wave generator circuitry determines the depth of the frequency modulation and read out speed of the section 124. Rotary wiper controls for the potentiometers 126, 128 are accessible through the face plate 48 of the component 6 shown in FIG. 6 as represented by the same reference numerals 126, 128. The chorus selection slide switch 118 is also accessible through the exposed face plate of the component 6 as shown in FIG. 6.

The chorus effects circuit shown in FIG. 14A also includes an expander section 130. This circuitry converts the signal from the section 124 to a suitable amplitude, such as the amplitude prior to the compression section 122.

The chorus effects circuit also includes an output amplifier section 132 shown in FIG. 14A. This circuitry mixes or decouples the base signal with the effects modulated signal.

Referring to FIG. 14C, a 9-volt battery is connected to terminals 134, 136 to energize the power supply circuit shown in this figure. This provides the power for the circuits of FIGS. 14A and 14B.

All of the elements of FIGS. 14A–14C are contained within the housing 30 of the component 6 shown in FIG. 6. Thus, this embodiment of the component 6 provides on-board effects processing that is directly controllable by the player while playing the musical instrument.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A component for a musical instrument having an analog signal generator responsive to playing of the musical instrument, comprising:

a tone control circuit having an input to receive an analog signal from the analog signal generator of the musical instrument such that said tone control circuit provides a tone controlled signal representative of the sound played by a player playing the musical instrument as modified by selectable control within said tone control circuit of bass, midrange and treble tone ranges;

an effects circuit connected to said tone control circuit such that said effects circuit generates an effects signal distinct from but in response to said tone controlled signal;

an output connected to receive said tone controlled signal;

a switch connected to said effects circuit to connect the effects signal of said effects circuit through said switch to said output in a first switch state such that said effects signal is output in conjunction with said tone controlled signal and to disconnect said effects circuit from said output in a second switch state such that only said tone controlled signal is output; and means for mounting said tone control circuit, said effects circuit, said output, and said switch on the musical instrument.

2. A component as defined in claim 1, wherein:

said means for mounting includes a housing adapted for being recessed on the body of the musical instrument, said housing having an exposed face when said housing is mounted on the musical instrument; and said switch is accessible to the player through said exposed face.

3. A component as defined in claim 2, wherein:

said effects circuit includes a chorus effects circuit having an intensity control potentiometer and a speed control potentiometer, each of said potentiometers having respective wiper controls accessible to the player through said exposed face of said housing; and said tone control circuit includes tone control potentiometers having wiper controls accessible to the player through said exposed face of said housing.

4. A component for a musical instrument having an analog signal generator responsive to playing of the musical instrument, comprising:

a tone control circuit having an input to receive an analog signal from the analog signal generator of the musical instrument such that said tone control circuit provides a tone controlled signal representative of the sound played by a player playing the musical instrument;

an effects circuit connected to said tone control circuit such that said effects circuit generates an effects signal in response to said tone controlled signal, wherein said effects circuit includes:

means for compressing a signal derived from the analog signal generator;

means for changing a frequency of a compressed signal from said means for compressing; and means for expanding a changed signal from said means for changing;

an output connected to receive said tone controlled signal;

a switch to connect said effects circuit to said output in a first switch state such that said effects signal is output in conjunction with said tone controlled signal and to disconnect said effects circuit from said output in a second switch state such that only said tone controlled signal is output; and means for mounting said tone control circuit, said effects circuit, said output, and said switch on the musical instrument.

5. A component for a musical instrument having an analog signal generator responsive to playing of the musical instrument, comprising:

an electrical signal processing effects circuit, wherein said electrical signal processing effects circuit includes:

means for compressing a signal derived from the analog signal generator;

means for changing a frequency of a compressed signal from said means for compressing; and means for expanding a changed signal from said means for changing; and a housing having said electrical signal processing effects circuit mounted therein, said housing adapted to mount on the musical instrument and to connect to the analog signal generator.

6. A component for a guitar having an analog signal generator responsive to playing at least one string of the guitar, the component comprising:

an electrical signal processing effects circuit that adds electrical characteristic, distinct from equalizing tone control, to an electric signal generated in response to operation of the analog signal generator, wherein said electrical signal processing effects circuit includes:

a low pass filter section;

a compression section connected to said low pass filter section;

a frequency modulation section connected to said compression section;

a triangle wave generator and voltage controlled oscillator section to control detuning in an effects signal and the rate of the detuned effects signal; and an expander section connected to said triangle wave generator and voltage controlled oscillator section; and a housing having said electrical signal processing circuit mounted therein, said housing adapted to mount on the guitar such that said electrical signal processing effects circuit operates on board the guitar to create an effects-containing electrical signal that is output from the guitar.

7. A component for a guitar having an analog signal generator responsive to playing at least one string of the guitar, the component comprising:

an electrical signal processing effects circuit that adds electrical characteristic, distinct from equalizing tone control, to an electric signal generated in response to operation of the analog signal generator; and a housing having said electrical signal processing circuit mounted therein, said housing adapted to mount on the guitar such that said electrical signal processing effects circuit operates on board the guitar to create an effects-containing electrical signal that is output from the guitar, wherein the guitar has a hollow body defined in part by a rim side and further wherein said housing mounts through the rim side of the guitar.

8. A component as defined in claim 7, wherein the added electrical characteristic provides an effect from the group consisting of a chorus effect, a reverb effect, and a flanger effect.

9. A component as defined in claim 7, wherein the added electrical characteristic provides an effect from the group consisting of a chorus effect and a flanger effect.

10. A component for a guitar having an analog signal generator responsive to playing at least one string of the guitar, the component comprising:

an electrical signal processing effects circuit that adds electrical characteristic, distinct from variable-resistance non-effects frequency tone control of bass, midrange and treble tone ranges, to an electric signal generated in response to operation of the analog signal generator, wherein said electrical signal processing effects circuit includes:

a low pass filter section;

a compression section connected to said low pass filter section;

a frequency modulation section connected to said compression section;

a triangle wave generator and voltage controlled oscillator section to control detuning in an effects signal and the rate of the detuned effects signal; and an expander section connected to said triangle wave generator and voltage controlled oscillator section; and a housing having said electrical signal processing circuit mounted therein, said housing adapted to mount on the guitar such that said electrical signal processing effects circuit operates on board the guitar to create an effects-containing electrical signal that is output from the guitar.

11. A component for a guitar having an analog signal generator responsive to playing at least one string of the guitar, the component comprising:

an electrical signal processing effects circuit that adds electrical characteristic, distinct from variable-resistance non-effects frequency tone control of bass, midrange and treble tone ranges, to an electric signal generated in response to operation of the analog signal generator; and a housing having said electrical signal processing circuit mounted therein, said housing adapted to mount on the musical instrument such that said electrical signal processing effects circuit operates on board the guitar to create an effects-containing electrical signal that is output from the guitar, wherein the guitar has a hollow body defined in part by a rim side and further wherein said housing mounts through the rim side of the guitar.

12. A component as defined in claim 11, wherein the added electrical characteristic provides an effect from the group consisting of a chorus effect, a reverb effect, and a flanger effect.

13. A component as defined in claim 11, wherein the added electrical characteristic provides an effect from the group consisting of a chorus effect and a flanger effect.

14. A component for a musical instrument having an analog signal generator responsive to playing of the musical instrument, comprising:

an electrical signal processing effects circuit; and a housing having said electrical signal processing effects circuit mounted therein, said housing adapted to mount on the musical instrument and to connect to the analog signal generator such that said electrical signal processing effects circuit operates on board the musical instrument to create an effects-containing electrical signal for output from the musical instrument when the musical instrument is played, wherein the musical instrument has a hollow body defined in part by a rim side and further wherein said housing mounts through the rim side of the musical instrument.

15. A component as defined in claim 14, further comprising a tone control circuit operatively associated with said electrical signal processing effects circuit in said housing.

16. A component for a musical instrument having an analog signal generator responsive to playing of the musical instrument, comprising:

electrical signal processing effects means; and a housing having said electrical signal processing effects means mounted therein, said housing adapted to mount on the musical instrument and to connect to the analog signal generator such that said electrical signal processing effects means operates on board the musical instrument to create an effects-containing electrical signal for output from the musical instrument when the musical instrument is played, wherein the musical instrument has a hollow body defined in part by a rim side and further wherein said housing mounts through the rim side of the musical instrument.

17. A component as defined in claim 16, further comprising variable-resistance non-effects tone control means for at least bass, midrange and treble tone ranges operatively associated with said electrical signal processing effects means in said housing.

18. A component for a musical instrument having an analog signal generator responsive to playing of the musical instrument, comprising:

a musical effects controller for an electrical signal; and a housing having said musical effects controller mounted therein, said housing adapted to mount on the musical instrument and to connect to the analog signal generator such that said musical effects controller operates on board the musical instrument to create an effects-containing electrical signal for output from the musical instrument when the musical instrument is played, wherein the musical instrument has a hollow body defined in part by a rim side and further wherein said housing mounts through the rim side of the musical instrument.

19. A component as defined in claim 18, further comprising a tone controller for at least bass, midrange and treble tone ranges operatively associated with said musical effects controller in said housing.

20. A component providing on-board signal effects for a hollow body acoustic guitar having an analog signal generator responsive to playing of the guitar, wherein the analog signal generator is selected from the group consisting of a piezoelectric pickup, an electromagnetic pickup, and a microphone, the component comprising:

an electrical signal processing effects circuit; and a housing having said electrical signal processing effects circuit mounted therein, said housing configured to mount on a rim side of the hollow body of the acoustic guitar and to connect to the analog signal generator selected from the group consisting of a piezoelectric pickup, an electromagnetic pickup, and a microphone in operative association with said electrical signal processing effects circuit.

21. A component as defined in claim 20, further comprising a tone control circuit operatively associated with said electrical signal processing effects circuit in said housing.

22. A component providing on-board signal effects for a hollow body acoustic guitar having an analog signal generator responsive to playing of the guitar, wherein the analog signal generator is selected from the group consisting of a piezoelectric pickup, an electromagnetic pickup, and a microphone, the component comprising:

electrical signal processing effects means; and a housing having said electrical signal processing effects means mounted therein, said housing configured to mount on a rim side of the hollow body of the acoustic guitar and to connect to the analog signal generator selected from the group consisting of a piezoelectric pickup, an electromagnetic pickup, and a microphone in operative association with said electrical signal processing effects means.

23. A component as defined in claim 22, further comprising variable-resistance non-effects tone control means for at least bass, midrange and treble tone ranges operatively associated with said electrical signal processing effects means in said housing.

24. A component providing on-board signal effects for a hollow body acoustic guitar having an analog signal generator responsive to playing of the guitar, wherein the analog signal generator is selected from the group consisting of a piezoelectric pickup, an electromagnetic pickup, and a microphone, the component comprising:

a musical effects controller for an electrical signal; and a housing having said musical effects controller mounted therein, said housing configured to mount on a rim side of the hollow body of the acoustic guitar and to connect to the analog signal generator selected from the group consisting of a piezoelectric pickup, an electromagnetic pickup, and a microphone in operative association with said musical effects controller.

25. A component as defined in claim 24, further comprising a tone controller for at least bass, midrange and treble tone ranges operatively associated with said musical effects controller in said housing.

* * * * *

UNITED STATES PATENT AND TRADEMARK OFFICE

CERTIFICATE OF CORRECTION

PATENT NO. : 6,242,682 B1
DATED : June 5, 2001
INVENTOR(S) : Josip Marinic and James R. Rosenberg It is certified that error appears in the above-identified patent and that said Letters Patent is hereby corrected as shown below:

Title page,
Inventor information, delete "Thompson" and insert -- Thompsons -- therefor.

Column 1,
Lines 5 and 6, delete "6/075,194" and insert -- 6,075,194 -- therefor.

Column 9,
Line 27, delete "is".

Signed and Sealed this

Twenty-fifth Day of December, 2001

*Attest:*

JAMES E. ROGAN
*Director of the United States Patent and Trademark Office*

*Attesting Officer*